(12) United States Patent
Florido et al.

(10) Patent No.: US 12,057,240 B2
(45) Date of Patent: Aug. 6, 2024

(54) COMPACT REACTOR WITH HORIZONTAL STEAM GENERATORS AND PRESSURIZER

(71) Applicant: INVAP S.E., Rio Negro (AR)

(72) Inventors: Pablo Florido, Rio Negro (AR);
Rodolfo Carlevaris, Rio Negro (AR);
Alberto Patrignani, Rio Negro (AR)

(73) Assignee: INVAP S.E., Rio Negro (AR)

( * ) Notice: Subject to any disclaimer, the term of this patent is extended or adjusted under 35 U.S.C. 154(b) by 607 days.

(21) Appl. No.: 16/025,510

(22) Filed: Jul. 2, 2018

(65) Prior Publication Data

US 2020/0005950 A1 Jan. 2, 2020

(51) Int. Cl.
| | |
|---|---|
| *G21C 1/08* | (2006.01) |
| *F22B 1/02* | (2006.01) |
| *G21C 1/32* | (2006.01) |
| *G21C 15/00* | (2006.01) |
| *G21C 15/14* | (2006.01) |
| *G21D 1/00* | (2006.01) |
| *G21D 1/04* | (2006.01) |

(52) U.S. Cl.
CPC .............. *G21C 1/326* (2013.01); *F22B 1/023* (2013.01); *G21C 1/086* (2013.01); *G21C 15/00* (2013.01); *G21C 15/14* (2013.01); *G21D 1/006* (2013.01); *G21D 1/04* (2013.01)

(58) Field of Classification Search
CPC . G21C 1/086; G21C 1/09; G21C 9/04; G21C 13/024; G21C 13/032; G21C 1/322; G21C 15/243; G21C 13/02; G21C 15/00; G21C 15/02; G21C 15/16; G21C 15/18; G21C 15/26; G21C 19/07; G21C 19/40; G21C 7/08; G21C 1/326; G21C 13/028; G21C 15/14; G21C 15/247; G21C 21/00; G21C 3/356; G21C 9/022; G21C 15/12; G21C 15/24; G21D 1/006; F22B 15/00; F22B 1/123; F22B 1/162; F22B 37/002; F22B 35/004; F22B 29/064; F22B 37/327; Y02E 30/30
See application file for complete search history.

(56) References Cited

U.S. PATENT DOCUMENTS

| | | | | |
|---|---|---|---|---|
| 3,212,565 A | * | 10/1965 | Esleeck | G21C 1/09 165/104.27 |
| 3,245,463 A | * | 4/1966 | Benedict | G21C 1/09 165/104.31 |
| 3,395,076 A | * | 7/1968 | Ruppen, Jr. | G21C 1/326 976/DIG. 10 |

(Continued)

OTHER PUBLICATIONS

United States Nuclear Regulatory Commission Glossary, https://www.nrc.gov/reading-rm/basic-ref/glossary/neutron-flux.html (Year: 2020).*

*Primary Examiner* — Sharon M Davis
(74) *Attorney, Agent, or Firm* — Lippes Mathias LLP (57) ABSTRACT

A compact pressurized water nuclear reactor having connected to the reactor pressure vessel a plurality of pressure vessels connected by nozzles, and connected by curved horizontal pressure vessel heads by having their central axis horizontal, with reduced stress and simple single connection between the respective nozzle of the reactor pressure vessel with the respective nozzle of each curved horizontal pressure vessel heads, all with the same internal and external design pressure.

6 Claims, 9 Drawing Sheets

(56) References Cited

U.S. PATENT DOCUMENTS

| | | | | |
|---|---|---|---|---|
| 3,888,734 | A * | 6/1975 | Juric | G21C 1/326 |
| | | | | 376/298 |
| 4,039,377 | A * | 8/1977 | Andrieu | G21C 1/322 |
| | | | | 976/DIG. 200 |
| 4,511,532 | A * | 4/1985 | Pierart | G21C 13/024 |
| | | | | 376/461 |
| 5,278,880 | A * | 1/1994 | Baker | G21C 1/09 |
| | | | | 376/285 |
| 5,331,677 | A * | 7/1994 | Matsuoka | G21C 15/18 |
| | | | | 376/402 |
| 2012/0224663 | A1* | 9/2012 | Patel | F22B 37/248 |
| | | | | 376/260 |
| 2015/0243388 | A1* | 8/2015 | Singh | G21D 1/006 |
| | | | | 376/361 |
| 2016/0019988 | A1* | 1/2016 | Bonhomme | G21C 13/10 |
| | | | | 376/277 |
| 2017/0133113 | A1* | 5/2017 | Ingremeau | G21D 1/04 |
| 2017/0321880 | A1* | 11/2017 | Lakhov | G21D 5/12 |
| 2018/0033500 | A1* | 2/2018 | Park | G21C 1/32 |

* cited by examiner

COMPACT REACTOR WITH HORIZONTAL STEAM GENERATORS AND PRESSURIZER

INCORPORATION BY REFERENCE

U.S. Pat. No. 2,862,479 by Robert U. Blaser et al., issued Dec. 2, 1958 and entitled "VAPOR GENERATING UNIT";

U.S. Pat. No. 3,151,034 by Royal M. Douglass et al., issued Sep. 29, 1964 and entitled "CONSOLIDATED NUCLEAR STEAM GENERATOR ARRANGEMENT";

U.S. Pat. No. 3,213,833 by Richard C. Cunningham et al., issued Oct. 26, 1965 and entitled "UNITIZED VAPOR GENERATION SYSTEM";

U.S. Pat. No. 3,255,088 by Theodore S. Sprague et al., issued Jun. 7, 1966 and entitled "INTEGRAL NUCLEAR REACTOR-STEAM GENERATOR UNIT";

U.S. Pat. No. 3,322,642 by Malcolm R. Williamson, issued May 30, 1967 and entitled "INTEGRATED NUCLEAR REACTOR-STEAM GENERATOR";

U.S. Pat. No. 3,325,374 by Peter H. E. Margen, issued Jun. 13, 1967 and entitled "COMPACT NUCLEAR REACTOR AND INTEGRAL HEAT EXCHANGER ARRANGEMENT";

U.S. Pat. No. 3,384,549 by Jacques Deliege et al., issued May 21, 1968 and entitled "NUCLEAR REACTOR";

U.S. Pat. No. 3,397,114 by Thomas Deighton, issued Aug. 13, 1968 and entitled "INTEGRAL NUCLEAR REACTOR-HEAT EXCHANGER ARRANGEMENT";

U.S. Pat. No. 7,154,982 B2 by Guy-Marie Gautier et al., issued Jan. 27, 2006 and entitled "COMPACT PRESSURIZED WATER NUCLEAR REACTOR";

U.S. Patent Application Publication No. 2012/0076254 A1 by John D. Malloy et al., published Mar. 29, 2012 and entitled "COMPACT NUCLEAR REACTOR";

U.S. Patent Application Publication No. 2013/0301790 A1 by Robert T. Fortino, published Nov. 14, 2013 and entitled "PRESSURIZED WATER REACTOR WITH REACTOR COOLANT PUMP SYSTEM INCLUDING JET PUMPS";

W. Marshall, "Nuclear Power Technology, Volume 1: Reactor Technology", Oxford University Press, US, Apr. 19, 1984;

M. Cumo, N. Afgan, "Nuclear Power Plant", CATTID, Distant Learning Center of University of Rome "La Sapienza" for Division of Engineering and Technology of UNESCO, Rome, Italy, 1992;

R. P. Kinsey, "British plans for nuclear ships". New Scientist (No 327) 21 Feb. 1963. London. UK. 1963;

P. H. Margen, "Designual design of a medium-output integrated PWR produced from components series intended for large units", Reports on a small and medium power reactors symposium held at IAEA, Oslo, on Oct. 12-16, 1970, IAEA Proceeding Series "Small and Medium Power Reactors 1970", Vienna, 1971;

Andrei Gagarinski, Victor Ignatiev, Lennart Devell, "Design and properties of marine reactors and associated R&D", Studsvik Report, ES-96/29, May 30, 1996;

Jean-Luc Delater. "La génèse de la propulsion nucléaire", article dated April 9th, 2005, at www.sous-mama-org, as abstract from the minutes of Defense Ministry Colloquium "1899/1999, one century building submarines", Oct. 25-26, 1999, Cherbourg, France;

K. S. Kozier, S. Kupca, "Small nuclear reactor safety design requirements for autonomous operation", Reports of IAEA's Technical Committee gathered in Mississauga, Ontario, Canada, May 15-19, 1995, International Atomic Energy Agency (IAEA), TECDOC 962, November 1997;

Guy-Marie Gautier. "Les REP Intégrés", Conference on small and medium power reactors for the energy production. Conference sur les reacteurs de petite et moyenne puissance pour la production d'energie. Paris, France, 11-12 Dec. 2001;

Hisashi Ninokata. "A comparative overview of the thermal hydraulic characteristics of integrated primary system nuclear reactors". Nuclear Engineering and Technology. Volume 38, Number 1. February 2006;

P. C. Florido, P. R. Rubiolo. "Cost Reduction and Standard Designs on Integrated PWR Technology. International Meeting "Nuclear Power Competitiveness in the Next Two Decades", Buenos Aires, 18-21 Nov. 1996;

P. C. Florido, J. E. Bergallo, M. V. Ishida. "Argentinean Integrated Small Reactor Design and Scale Economy Analysis of Integrated Reactor". Intematinal Conference "Nuclear Option in Countries with Small and Medium Electricity Grids". Dubrovnik, Croatia. 19-22 Jun. 2000;

Nuclear Energy Agency (NEA), Organization for Economic Co-operation and Development (OECD). "Small and Medium Reactors. I. Status and Prospects. Report by and Expert Group". OECD. Paris. 1991;

International Atomic Energy Agency (IAEA), IAEA TECDOC 1485 "Status of innovative small and medium size reactor designs 2005, Reactors with conventional refueling schemes". Vienna, Austria, 2006;

International Atomic Energy Agency (IAEA), "Advances in Small Modular Reactor Technology Developments". A Supplement to: IAEA Advanced Reactor Information System (ARIS). Vienna, Austria, 2016;

International Atomic Energy Agency (IAEA), "Small and Medium Power Reactors: Project Initiation Study Phase I". IAEA TECDOC 347. Vienna Austria, 1985;

EPRI, "Thermal Stratification, Cycling and Striping (TASCS) Final Report", March 1994. California. EE.UU. 1994; and NEA. "Thermal Cycling in LWR Components in OECD-NEA Members Countries". NEA/CSNI/R(2005)8. Paris, France, 2005 are all incorporated herein by reference in their entirety.

TECHNICAL FIELD OF THE DISCLOSURE

This disclosure in general refers to a compact nuclear reactor, particularly pressurized water reactor, with horizontal steam generators and pressurizer with coolant pumps to drive the primary coolant, all of them located and connected in the upper side of the reactor pressure vessel without large diameter pipes.

More specifically, this disclosure refers to the design of a compact Pressurized Water Reactor (PWR) in which the different components of the primary circuit are located and connected reducing the volume and weight required for all the primary circuit, without large diameter pipes, using horizontal Steam Generators (SG), pressurizer and Reactor Coolant Pumps (RCP) using nozzles located in the upper side of the Reactor Pressure Vessel (RPV). The connection between the RPV with each SG is performed using a single connection nozzle that separates the inlet and outlet coolant circulation with an internal flux divider, with the connection between the RPV and the pressurizer performed using a single connection between nozzles with a central connection channel.

Prior Art and Problems to Solve

In commercial available PWR power plants, the reactor core is located in the RPV, and the primary circuit is composed by the RPV, SGs and RCPs, which are connected by means of inlet and outlet pipes of large diameter. A pressurizer is used to regulate and control pressure of the primary circuit, which is connected with a single large diameter pipe called surge line.

This configuration, applied with different variants between the different PWR suppliers, as is detailed by Marshall and by Cumo et al, requires a relatively large space to accommodate the primary circuit that needs to be confined in the reactor containment building, which is also one of the most expensive cost items in a PWR.

Although the first PWR reactors, such as the Shippingport and Indian Point plants, started to be built in 1954 and 1956 respectively, having horizontal SG composed by vessels, drums and recirculation pumps, all connected with pipes, from the third PWR plant in Yankee Rowe, which began to be built in 1957, all the SGs, with the exemption of the Russian VVER designs, began to be designed and built with integrated and vertical SGs, such as the one proposed in the Blaser patent presented in 1956, where it was proposed to include in a single vertical vessel all the components that have made up the SGs of all previous designs. With different variants, this integral or compact SG design has been the design used by the different PWR commercial suppliers in countries such as the United States, England, Germany, France, Japan, South Korea and China, among others, and even in heavy water reactors. In all these cases, the SGs are connected to the RPV through large diameter pipes, usually called primary circuit cold leg and hot leg, that manage the coolant that enters and leaves the reactor core.

This design of compact or integrated SG, in which the connection pipes are replaced by a single mechanical vessel free of pipes with internal flow dividers that guide the flows, was also proposed and extended to unify the SGs and RPV of a PWR in a single vessel by Sprague et al in the year 1960, with the name of integral nuclear reactor, to achieve a compact configuration to minimize the volume required to contain the primary circuit.

In the Sprague proposal, the SG are made by straight tubes, with a lower inlet elbow and an upper outlet elbow for each tube, which are arranged in an annular array of bundles tubes, around an internal up flow coolant riser, which guide the core hot water outlet to the upper zone of the SG, giving free access to the top of the core for refueling and allowing to move the control rods by control rod drives that were fixed to the RPV upper vessel closure head.

A similar and contemporary proposal to Sprague is explained by Kinsey in 1963, in which he describes that in England in 1960 was studied, and presented to the English government in 1961, a type of compact and integral reactor in which the steam generator tubes were located around the core and its riser inside the RPV.

In all these designs, the authors proposed to eliminate the large diameter pipes connected to the RPV, in addition to allowing a compact design to eliminate from the design base the possibility of Large LOss of Coolant Accidents (L-LOCA) due to the failure of some of the large diameter primary pipes, which is one of the most demanding phenomenology for which a PWR reactor has to be designed.

A later variation to Sprague's proposal can be seen in Douglass et al proposal, presented in 1962, for an integrated reactor with a layout of the SG tubes in the annular space around the riser, but ascending around the riser following an helical trajectory, using a design similar to the one that was used later in the propulsion reactor of the Otto Hahn cargo ship, constructed between 1964 and 1968. Then it can be said that, with various variations, a typical solution of compact or integrated PWR reactor, which was tested in the Otto Hahn, is the one in which the SG are located inside the RPV, in the annular space between the core riser and the RPV. The Otto Hahn reactor operated from 1968 until 1979.

Another typical compact reactor solution, which uses a different configuration for SGs, which has also been tested in reactors that were finally built different from Otto Hahn design, is in operation today in several plants. This second type of compact reactor began operating in 1974 in France as a prototype reactor for a nuclear propulsion submarine. This design has been subsequently used for several military vessels currently in operation in France, as was described by Andrei Gagarinski et al in 1996 and Jean-Luc Delaeter in 2005. These designs are currently operative in several ships of the French Navy, in the Rubis class submarines, in the Triomphant class submarines and in the Charles de Gaulle aircraft carrier.

This second type of compact reactor began to be elaborated with analogous objectives of compactness and associated improvement in the elimination of large diameter pipes as integrated PWRs but with a different mechanical approach, because in the integrated PWRs that uses the Otto Hahn like approach, the space required to contain simultaneously the SG, the core and the riser is very large, and then the RPV diameter and weight are very large too.

A first proposal of this second type of compact PWR was submitted by Cunningham et al in 1960, proposing vertical SG connected directly to the pressure vessel above the core top by means of a horizontal tube plate that replaces the top of the RPV closure head. This patent does not use the term integrated or compact PWR to describe its proposal, which will be later the way to describe this type of reactors, calling them unitized reactors. The Cunningham patent describes, only few months after the Sprague patent, a different configuration, which today can be called compact reactor design.

This type of second compact PWR configuration does not allow simple access to the core top by removing the RPV closure head for inspection and refueling, because to get access to the core top it is required to move the entire SG. One advantage of this design, compared with the integrated PWR, is that it does not require increasing the diameter of the RPV to locate the steam generators and the vessel that houses the shell side of the tubes of the SG, this last at the pressure of the secondary system, which is much lower than the pressure of the primary system.

Later, P. H Margen presented a patent in 1963 and published a design for a 400 and 500 MWe power reactor in 1970, where the vertical SG was also above the core top. A variant to this design was presented by Deighton in a patent in 1966 with a design in which it was also necessary to remove the SG for replacement or inspection of the core because it was above the core top, but with a central pipe for the hot leg of the primary circuit that reached an upper plenum where the pressurizer was also located, to descend through the tube side of an annular SG that covered a large fraction of the core top area.

Recently, other alternatives with SG above the core top but with central riser for the hot leg of the primary circuit at the center of the SG can be seen in the Gautier et al proposal presented in 2002, and Malloy et al proposal presented in 2010.

As can be seen in the comparison and review of integrated reactors designs made by Kozier et al in 1995, by Gautier in 2001, or by Ninokata in 2006, designs of integrated and compact reactors have been continually elaborated over time, looking for a competitive design for different markets.

Today there are still under elaboration designs with both positions of the SG, annular or above the core top, with another element that also changes from one design to another, as can be seen in the mentioned reviews, with similar relevance to the relevance of the location of the SG: this element is the arrangement and location of the RCP for those reactors without natural circulation for the primary coolant.

In his patent, Fortino described that for integrated PWR with 100 MW or more of electric power, the natural convection is uneconomical, and pumps must be added to drive the primary coolant. Florido et al in 1996 and in 2000, show that from 300 to 400 thermal MW the option of using pumps to drive the primary coolant is more economically attractive than natural convection. This correspond well with the mentioned Fortino's limit of 100 electric MW, considering the specific design details of the integrated PWR under consideration, and comparing the weight of the RPV by energy produced to the cost of the net electrical generation.

Then, an important new element when designing a compact or integrated nuclear reactor of more than 100 MWe for power generation is the location and orientation of the RCPs, which explain why there are different alternatives or designs depending on where and how to place the RCPs and a competitive design is sought from the point of view of a competitive power for an electrical grid.

Various possible positions and orientations have been proposed over time regarding where to place the RCPs in a compact or integrated reactor, and how it is connected to the RPV. The connection has been proposed to be by means of short pipes that may or may not be concentric, or directly connected to the RPV, or by short nozzles. The orientation of the RCP has been given both vertical axis with the impeller below or above the electric motor, or RCP with the rotation axis horizontal or with some angle other than zero or 90 degrees from the vertical. The position of the RCP or the related penetration in the RPV also change from one design to another: placing the pump at the RPV center below the lower vessel head, or annularly in the lower head, or through horizontal or angled penetrations below or above the core top but in contact with the cold leg of the coolant circuit at the outlet of the SGs, or in contact with the hot leg of the coolant circuit before the entry of the SGs, or in the upper vessel closure of RPV, or even submerged with the rotor of the electric motor inside the primary coolant.

This wide range of variations for the RCP can be understood as a result of the inherent complexity of placing the RCP in an integrated or compact PWR and the advantages and disadvantages of each proposal. While in commercial PWR reactors pumps are always located in the cold leg to avoid cavitation problems during power operation or during start-stop transients, to have lower power consumption and to have easy access for the control and maintenance of the RPC, the location is not so simple for compact or integrated reactors.

For the case of an integrated reactor with the SG arranged in an annular arrangement inside the RPV, locating the pumps in the cold leg implies placing the RCP very close to the top of the core, which would imply special considerations for the inspection and maintenance of the pumps, or otherwise moving away from the RPV and adding additional radiation shields for the RCP, requiring pipes of appropriate length and diameter to connect the pump, which would compromise the design of compact or integrated reactor and would have the disadvantage of not being able to totally eliminate the risk of failure of large diameter pipes of the primary circuit.

On the other hand, if the RCP of an integrated PWR are located in the hot leg, the pumps would be in a position of easy inspection and maintenance, since the inlet of the primary coolant of the SG is usually in the upper part of the RPV. However, it would require a complex operation because during transients and changes in the pressures and temperature, the pump could have cavitation problems or restrictions in the reactor operation, in addition to moving away from the widespread and good commercial experience of the RCP of commercial reactors.

Similar variations and proposals for the position of the RCP in a compact PWR with the SG arranged at the top of the reactor core can be seen, for example, in the patents of Fortino in 2012 and Malloy et al in 2013.

That is why some even more complex configurations have been proposed for the RCP location, with other disadvantages and advantages with respect to the locations already mentioned, to be able to locate the RCP in the cold branch in a compact or integrated reactor. For example, in the Williamson proposal in 1965, different designs were presented to drive the circulation of the coolant entering and leaving the SG in an integrated PWR. In the proposal of Deliege and others in 1965, an integrated PWR design with steam generators divided into two parts is presented, so that mechanically the pump was above the SG, but thermally located when the coolant had already been sub cooled by leaving a first section of the SG.

It can be seen that for all designs of integrated reactors with the SG located around the riser inside the RPV, although they can have a simple refueling by moving only the RPV closure head, the diameter of the RPV is significantly greater than in those designs that do not have the SG arranged around the core riser and therefore have greater weight and cost compared with compact PWR designs with the SG above the core top. But the compact PWR, although it has the advantage of a smaller size, weight and cost of the RPV, has the disadvantage that it is necessary to move the heavy, complex and bulky SG with its pipes, supports, insulation and instrumentation to have access to the core top and perform the reactor refueling.

This trade off between the two designs can explain the recent proposal of a third type of compact PWR, if any PWR is called compact when the arrangement and connection between the different components of the primary circuit are done in such a way to reduce its volume and weight, and reduce the diameter of pipes that can generate a L-LOCA. This definition of a compact reactor is similar to the definition of an integrated reactor that is used, for example, by the NEA-OECD in 1991 or the IAEA in 2006, and can be taken as the general definition that includes all these types of compact and integrated reactors. Using this definition of compact PWR, an integrated PWR is a compact PWR in which the SG are placed inside the RPV.

The 2016 IAEA SMR booklet includes a description of PWR, called CAP200, with vertical SGs above the core top with a compact design, which prevents vertical SG from challenging the removal of the RPV closure head for refueling. This type of solution is similar to a previous design, called NP 300, which the IAEA describes in 1985.

In the CAP200 PWR the vertical SG are located next to the RPV and connected without pipes. In this design, each vertical SG is connected by a single horizontal nozzle directly to a corresponding horizontal nozzle in the RPV. This unique connection for each vertical SG allows the inlet and outlet of the coolant through concentric flux dividers, and because nozzles are part of the RPV and are not considered a pipe, this type of connection eliminates the risk of L-LOCA from the design bases.

The NP 300 design, which used the same type of vertical SG and pump location and connection than the CAP200 design, differs from the latter in that it has a short section of large diameter horizontal pipe that connected both nozzles, then the probability of a L-LOCA is reduced but could not be totally eliminated.

The CAP200 and NP 300 designs, although they share the advantage of having a RPV with low size and cost, combined with the advantage of not interfering with core refueling, introduces two additional challenges. The first challenge is having the RCPs in the lower head of each SG, leaving the electric motor below the SG at the same level of the reactor core, thus demanding additional shielding and bringing about problems for RCP inspection and maintenance. The second challenge is that the steam generators are bulky and heavy and have their center of gravity high compared with the height of the connection between the RPV and the SGs, and the RPV is also bulky and heavy and has its center of gravity very low compared with the height of the connection between the RPV and SGs, which imply a great mechanical load for the nozzles against earthquakes and would require complex structures of support and damping.

Both CAP200 and NP300 designs have a pressurizer connected to the RPV using surge line pipes, which are in the range of medium size pipe diameter. The compact PWR reactor of the French Navy also has an external pressurizer connected to the pressure vessel with a surge line. Only the Otto Hahn reactor did not have a pressurizer connected with a surge line to the RPV, but instead was self-pressurized with a steam dome inside the RPV. The problem of this self-pressurization is that it does not allow to operate economically at higher power because it implies that the core has low power density due to the low sub-cooling at the core inlet, and it challenges the RPV fatigue cycles due to the constant changes of the pressure of the primary system. Some current designs of integrated or compact PWR do not use an external pressurizer connected by a surge line, but instead propose using integrated pressurizer inside the upper zone of the RPV. These designs propose to control the pressure using spray and heaters inside the RPV to be able to pressurize the whole primary system, and operate at higher power densities and stable pressure. But this type of solution involves solving multiple problems for which there is no operational experience in current commercial PWR, with the additional disadvantage that, in order to perform the core refueling, the bulky and heavy pressurizer needs to be moved, together with all its systems, instruments, valves, pipes and heaters.

In addition, the height required for the reactor containment building of a compact PWR with about 100 to 300 electric MW is not substantially lower than large commercial PWR, but the reactor containment building requires a much lower diameter, thus resulting in a slender building. Then this containment building could be challenged by earthquakes, and are complex and expensive to be buried as is usually proposed for compact PWR to reduce the risk of aircraft crashes.

Hence, there is a clear need to provide a compact PWR design that does not have large diameter pipes connecting the different components of the primary system, with the smallest possible size for the RPV, being simple and easy to maintain, operate and to be refueled, with minimum problems against earthquakes without complex support structures, and in which the RCP does not have cavitation restrictions or require special shielding.

SUMMARY OF THE DISCLOSURE

This disclosure in general refers to a compact nuclear reactor, particularly a pressurized water reactor, with horizontal steam generators and pressurizer, with coolant pumps to drive the primary coolant, all of them connected in the upper side of the pressure vessel without large diameter pipes that could fail and produce a large loss of coolant accident, not requiring to move the steam generators to perform the refueling, allowing easy access to the reactor coolant pumps, using a small size pressure vessel, with reduced stress to seismic loads in all the primary circuit, and requiring a low height reactor containment building.

Considering the disadvantages inherent to the mentioned systems, this disclosure has been conceived to solve these problems. In other words, the purpose of this disclosure is to provide a new design of a compact PWR that allows lowering costs, improving the operation and maintenance, and performing non-complex refueling operations, at the same time that it does not have weak points against earthquakes, thermal stress, stratifications, complex support structures or a slender reactor containment building.

It is yet another purpose of this disclosure to locate the reactor coolant pumps in a position to facilitate maintenance, inspection, and the safe operation of the pumps, through a simple design that prevents cavitation.

This disclosure consists of a mechanical solution of horizontal SG and pressurizer with RCP to drive the primary coolant without pipes in the connections, by using a single nozzle to connect each SG and pressurizer to the RPV. The central axis of each SG and pressurizer are horizontal, minimizing thermal stress and weak points against earthquakes. The RCP are located with nozzles directly to the pressure vessels far away from the core top without cavitation problems. The mechanical solution allows a RPV with reduced dimension and weight, without interference with the SG or pressurizer for refueling, a reactor containment building with reduced height, reduced stress for earthquakes or temperature or pressure changes in the primary pressure envelope, or thermal stratification stress in the surge line.

BRIEF DESCRIPTION OF THE DRAWINGS

To better understand this disclosure, provided below is a detailed description on the basis of the following figures, which serve the sole purpose of illustrating the preferred way to execute this patent and not to represent a limit to the disclosure.

DETAILED DESCRIPTION OF THE DISCLOSURE

Prior to proceeding with a detailed description, note that the described execution is not restricted to being used together with a specific type of nuclear reactor. Therefore, even when for explanatory convenience this execution is shown and described as applied to a compact PWR, it may be implemented on other types of nuclear reactors, as well as on other systems and environments.

This disclosure presents a new design compact PWR that yields a compact, light, simple, and economic reactor, as well as one that is easy to maintain, operate and to refuel, without weak points regarding earthquakes, thermal stress, stratifications or complex support structures.

Figure 1:
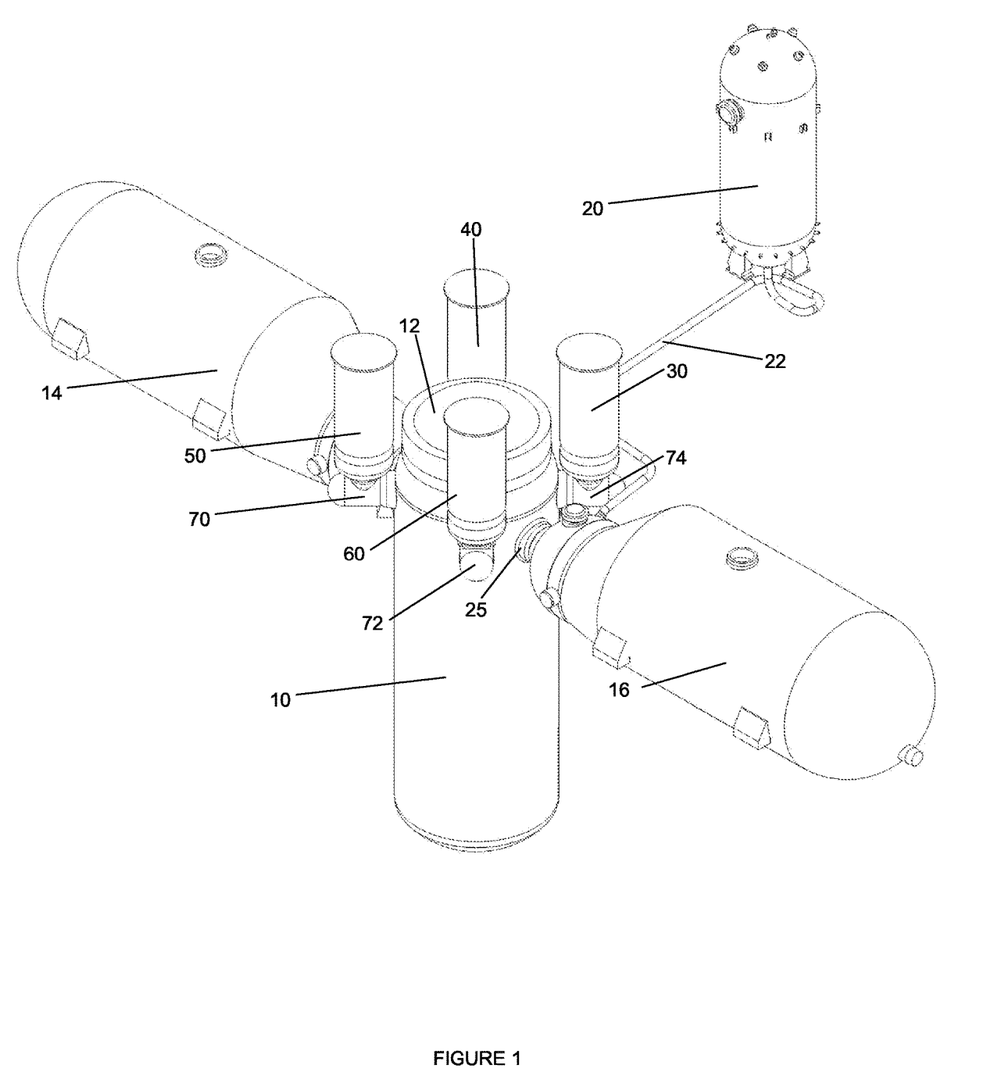
FIG. 1 is a perspective view of a compact PWR with the design proposed with two horizontal SGs connected by nozzles, and four RCP connected by nozzles and side connection vessels.

FIG. 1 is an external view of a compact PWR with the design proposed in which the RPV (10) with its closure head (12) its fixed to the vessel by bolts and nuts not shown in the picture, with two horizontal SGs (14) and (16), in this case with an external pressurizer (20) connected with the primary system with the surge line (22) which is in the range of a medium size pipe diameter. The horizontal SGs (14) and (16) are connected to the RPV (10) by nozzles, as is shown by the nozzle (25) without using pipes for the connection, by welding the respective RPV nozzle with the SG nozzle located in the primary side head of the SG. The four RCP (30) (40) (50) and (60) that drive the primary coolant have a vertical orientation and are connected with the RPV (10) by a nozzle directly connected to a side connection vessels (70) (72) and (74). The side connection vessel (70) connects the RCP (50) with the RPV (10), and the other side connection vessels (72) and (74) connect the respective RCPs (60) and (30) with the RPV (10). The RPCs (30) (40) (50) and (60) could be oriented in horizontal or in an intermediate angular inclination with respect to the vertical direction if it's convenient by its weight and size and in this case the connection with the RPV (10) could be done without side connection vessels (70) (72) and (74), if its required.

Figure 2:
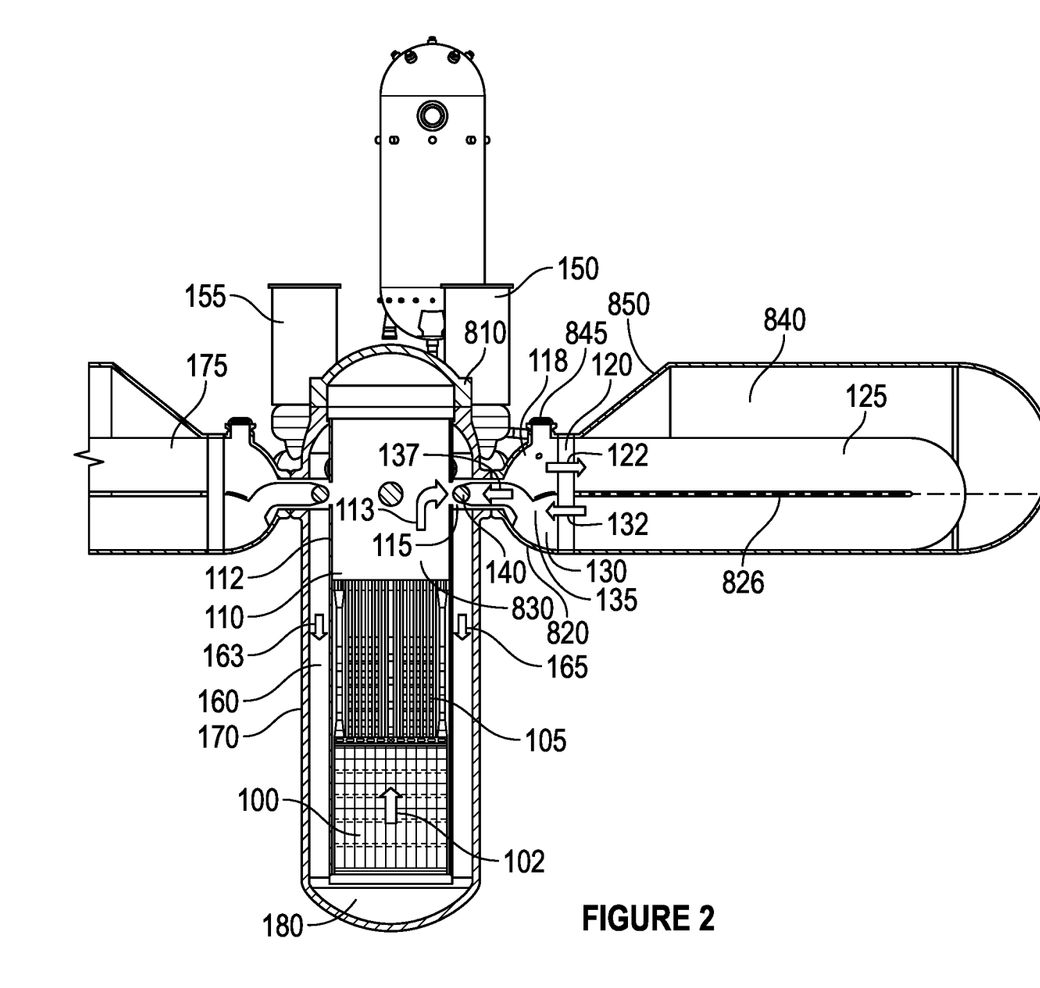
FIG. 2 is a side elevational cross-sectional partial view of the design shown in FIG. 1.

FIG. 2 is a schematic vertical section view of the design shown in FIG. 1, with the core (100) cooled by the ascendant cooling flow shown as a schematic arrow (102). The cooling flow crosses the zone of the control rod guide structure (105) up to an upper plenum (110). During the ascending trajectory, the coolant flow is surrounded by a cylindrical watertight flux divider (112) core barrel up the upper plenum to turn, as shown by the arrow (113), towards the SG inlet (115) that guides the coolant flow towards the inlet zone (118) of the primary side SG head. The coolant flow crosses the SG tube sheet (120), as is schematically shown by the arrow (122), to circulate through the horizontal U tube bundle (125), which are not individually shown in the figure, in horizontal direction and descends and returns to the outlet zone (130) of the primary side SG head after crossing the exit region of the tube sheet (120), as shown by the schematic arrow (132). The coolant flow is guided by the shell (135), as schematically shown by the arrow (137), towards the RPV to be guided by the flow separators (140) towards the RCP inlet, not shown in this view. The vertical RCP (150) and (155) discharge the coolant exit to the down corner (160) limited by the core barrel (112) and the RPV (170). The coolant flow descends, as shown by the schematic arrows (163) and (165), towards the lower plenum (180) prior to entering to the reactor core (100) to complete the primary coolant circuit. The coolant flow in the upper plenum (110) that is not directed towards the SG inlet (115) is directed towards the second SG tube bundle (175) to circulate in a similar way to the circulation in the tube bundle (125) and discharge the coolant exit to a common upper plenum of the coolant down corner (160).

Figure 3:
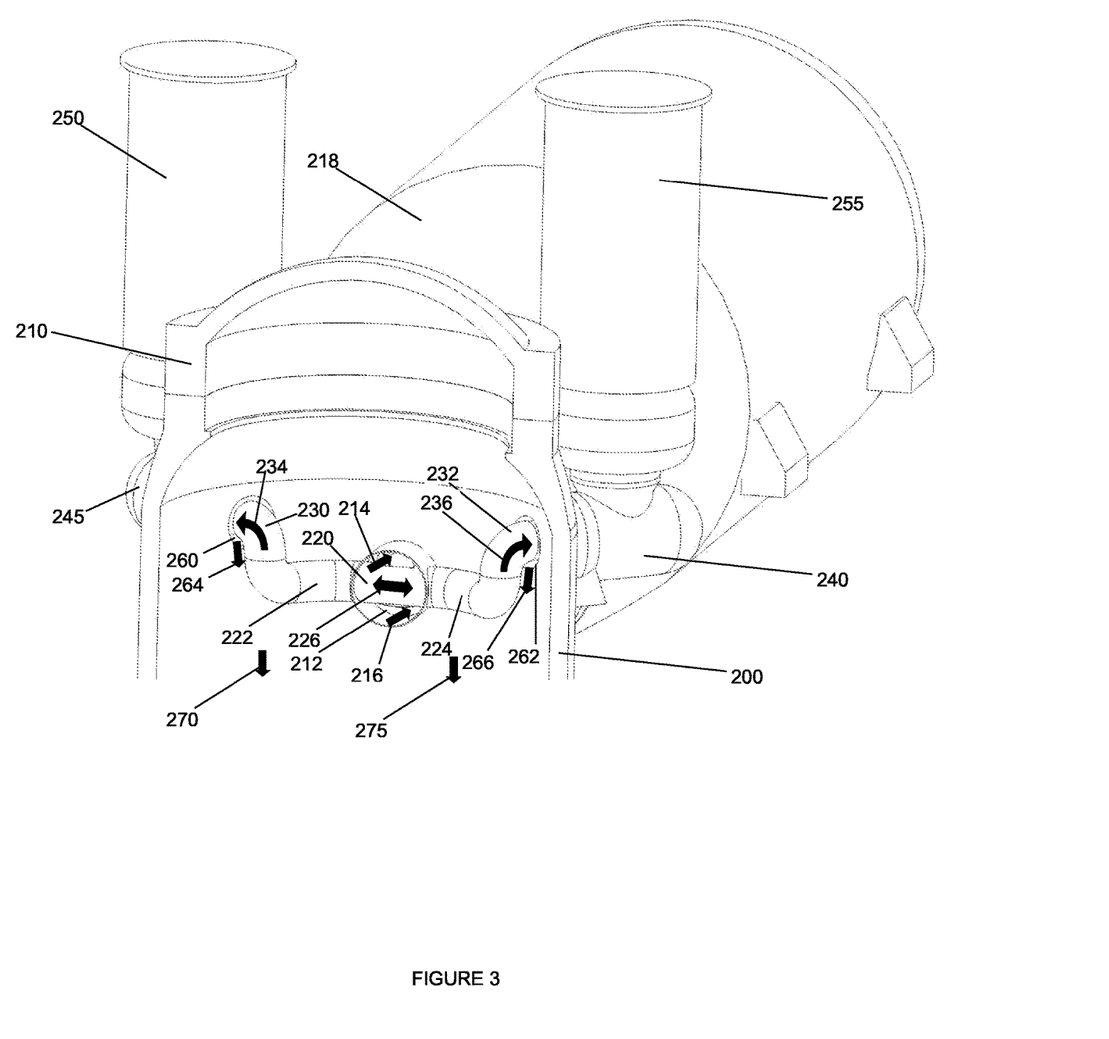
FIG. 3 is a perspective partial view of a vertical section of the RPV of the design shown in FIG. 1 to show the flux dividers that connect the cold water exit from one SG with the inlet of two RCP.

FIG. 3 is an external view of a vertical section of the RPV of the design shown in FIG. 1, in which the core barrel is not shown to visualize the coolant inlet and outlet of the SG. The RPV (200) and its vessel closure head (210) are shown to visualize the SG inlet guide annular channel (212), as shown by the schematic arrows (214) and (216), towards the SG (218) to return after being cooled by the water of the secondary circuit, through the central channel (220) to be redirected horizontally through the pipes (222) and (224), as shown by the schematic arrow (226), to be guided by the pipes (230) and (232), as shown schematically by the arrows (234) and (236), towards the central zone of the side connection vessels (240) and (245), towards the RCPs (250) and (255). The RCP discharge returns through the annular space (260) and (262), as is schematically shown by the arrows (264) and (266), discharging the coolant flow in the down corner limited by the RPV (200) and the core barrel not shown in the picture, to descends towards the core inlet, as is schematically shown by the arrows (270) and (275).

Figure 4:
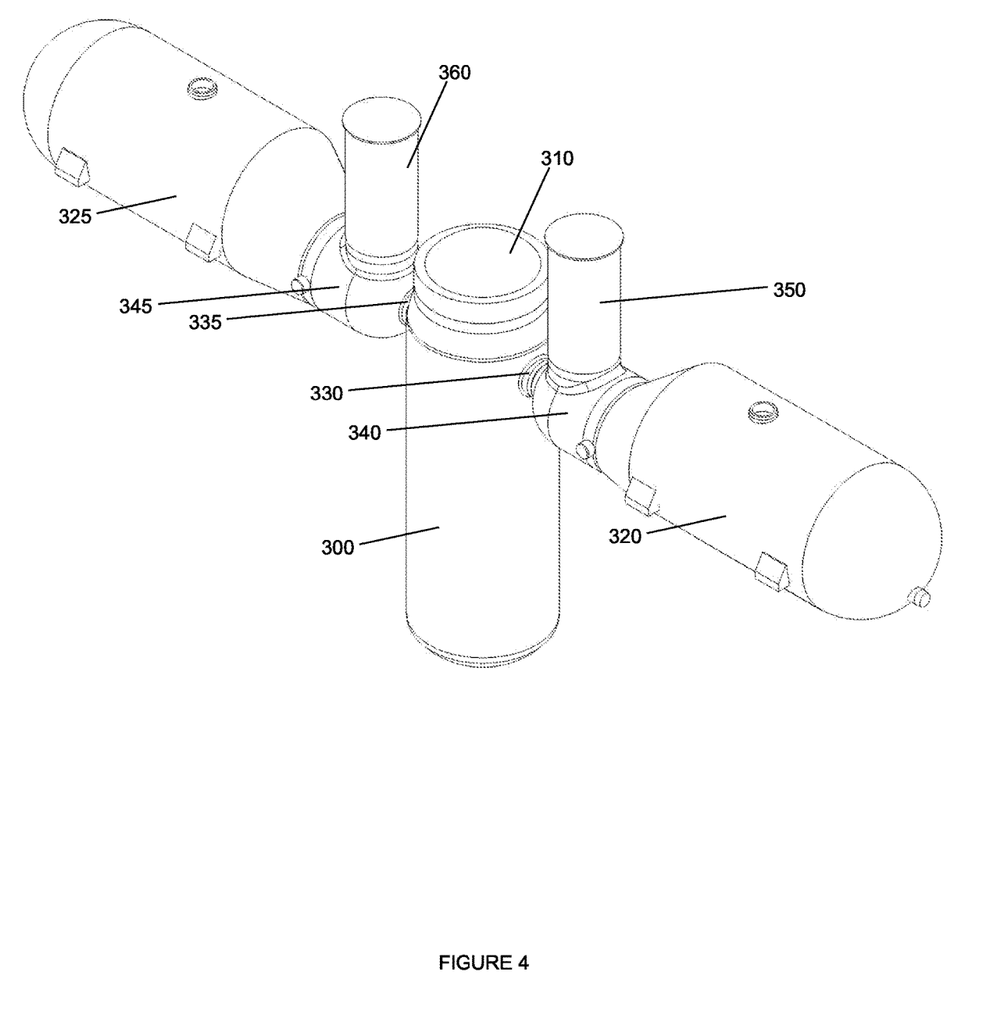
FIG. 4 is a perspective view of a compact PWR with the design proposed with two horizontal SGs connected by nozzles and two RCP connected by nozzles directly in the primary side of the horizontal SG vessel head.

FIG. 4 is an external view of a compact PWR with the design proposed with two horizontal SGs and two RCPs, in which the RPV (300) is shown with its closure head (310) and two horizontal SGs (320) and (325). The horizontal SGs (320) and (325) are connected to the RPV (300) with nozzles (330) and (335) without using pipes in the connection, connecting directly the RPV (300) with the primary side heads (340) and (345) of the horizontal SGs (320) and (325). The vertical RCPs (350) and (360) are connected directly to the primary side heads (340) and (345) of the horizontal SGs (320) and (325).

Figure 5:
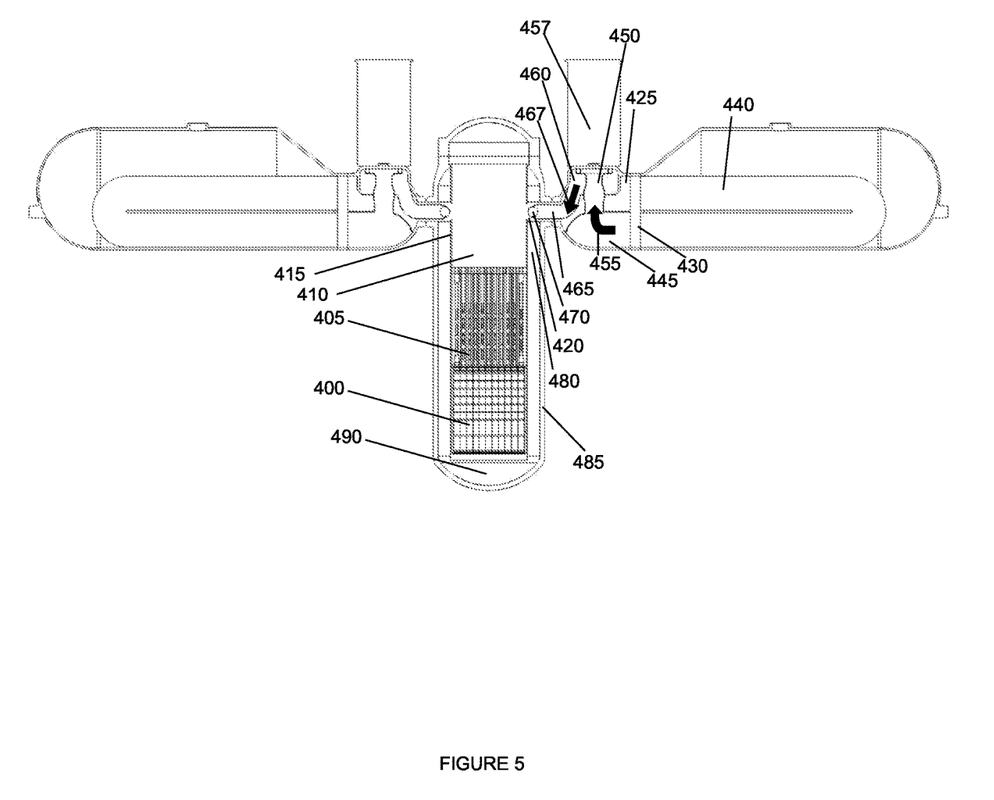
FIG. 5 is a side elevational view in cross section view of the drawing shown in FIG. 4.

FIG. 5 is a lateral schematic vertical section view of the design shown in FIG. 4, with the core (400) cooled by the ascendant cooling flow that crosses the zone of the control rod guide structure (405) up to an upper plenum (410). During the ascendant trajectory the coolant flow is surrounded by the watertight core barrel (415) until it reaches the SG water inlet (420) that guides the coolant flow towards the primary side SG inlet head (425), crosses the inlet section of the SG tube sheet (430), flows through the horizontal U tube bundle (440), which are not individually shown in the picture, in horizontal direction, and descends and returns to the outlet zone (445) of the primary side SG head after crossing the exit region of the tube sheet (430). The coolant flow is guided by the chamber (450), as schematically shown by the arrow (455), which feeds the centrifugal impeller, which is not shown in the picture, of the RCP (457). The RCP (457) discharges the coolant through the volute casing (460) to the pump exit, as schematically shown by the arrow (467), and circulates by the pipe (465) towards the lateral flow distributor (470) that discharges the coolant to the down corner (480) created by the core barrel (415) and the RPV (485) and reaches the lower plenum (490) and enters the core (400) to complete the primary coolant circuit. As the figure shows, the height of the overall primary coolant circuit, composed by the RPV (485) and the SGs and RPC (457), is much lower than the conventional and compact PWR layout, because the horizontal SG and RCP do not require higher elevation than the RPV, thus the height of the reactor containment building could be strongly reduced compared with other compact PWR, thus easier and less expensive to be underground y to reduce the risk of aircraft crashes together with reduce the building stress for seismic loads.

Figure 6:
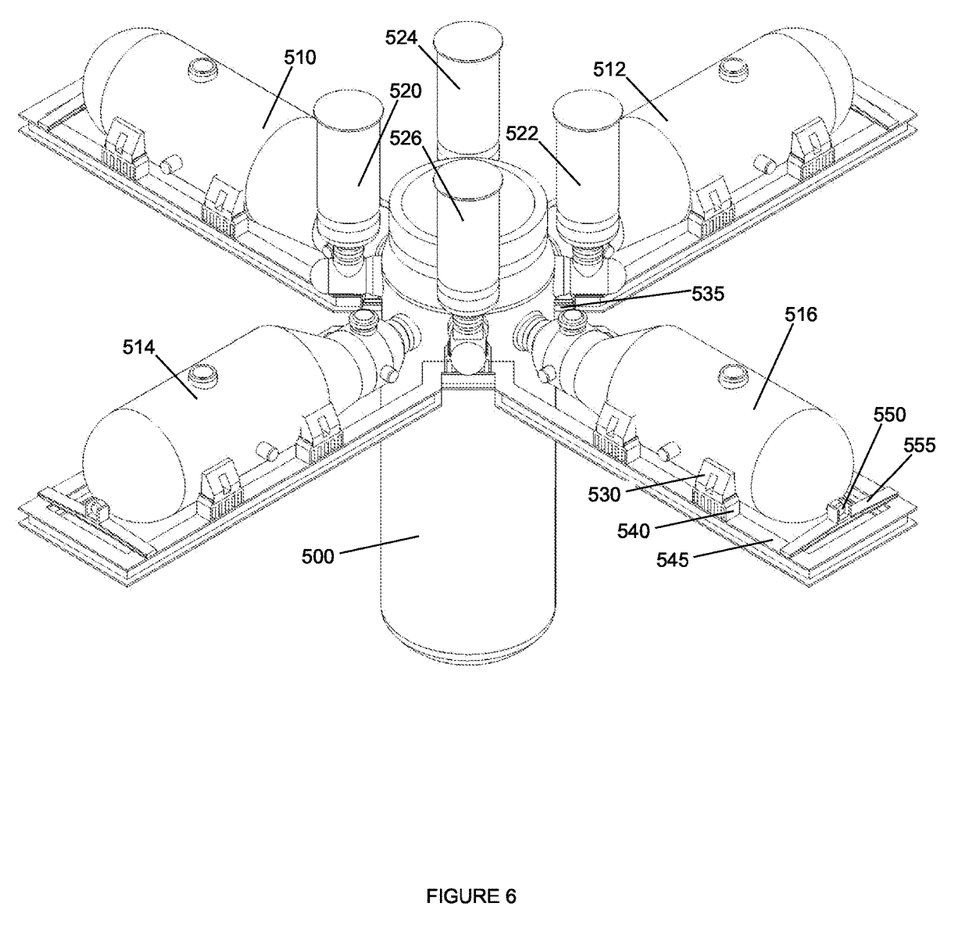
FIG. 6 is a perspective view of a compact PWR with the design proposed with four horizontal SG with four RCP connected to the RPV, showing the support pads and restrictors that transfer the loads to the support and basement and minimize the load during earthquakes.

FIG. 6 is an external view of a compact PWR with the design proposed with four horizontal SG with four RCP. The RPV (500) is connected with each horizontal SG (510) (512) (514) and (516) and each RCP (520) (522) (524) and (526) by nozzles. The horizontal SGs are supported by a plurality of support pads, as shown by the GV support pad (530), in a similar way as is supported the RPV which is supported by a plurality of support pads, as shown by the RPV support pad (535). All the plurality of supports pads are located at the same height of the horizontal mean plane of each SG connection nozzle, and each support pad transfers the weight load to a respective support structure, like the support structure (540), through a sliding surface that allows thermal and pressure related transversal and longitudinal dimensional changes. Each combination of support pad and support structure includes conventional up lift restrictors, not shown in the figure, for accidental conditions. The combination of all the support beams transfers the weight load to a common support structure (545) that transfers the load to the civil works and the reactor basement, not shown in the figure. Each SG has a sliding key in the outer head, as the sliding key (550) that is limited by lateral, top and bottom restrictor (555) that allows axial growing of the SG and radial growing of the RPV, but limits the lateral and vertical SG movement by horizontal and vertical seismic and accidental responses. With the SG center of gravity close to the sliding surface between the support pads and support structures, and the middle plane of the each respective nozzle in combination with the outer sliding key in each GV produce minimal loads against earthquakes in both vertical and horizontal combination, reducing the stress in nozzles in accidental conditions.

Figure 7:
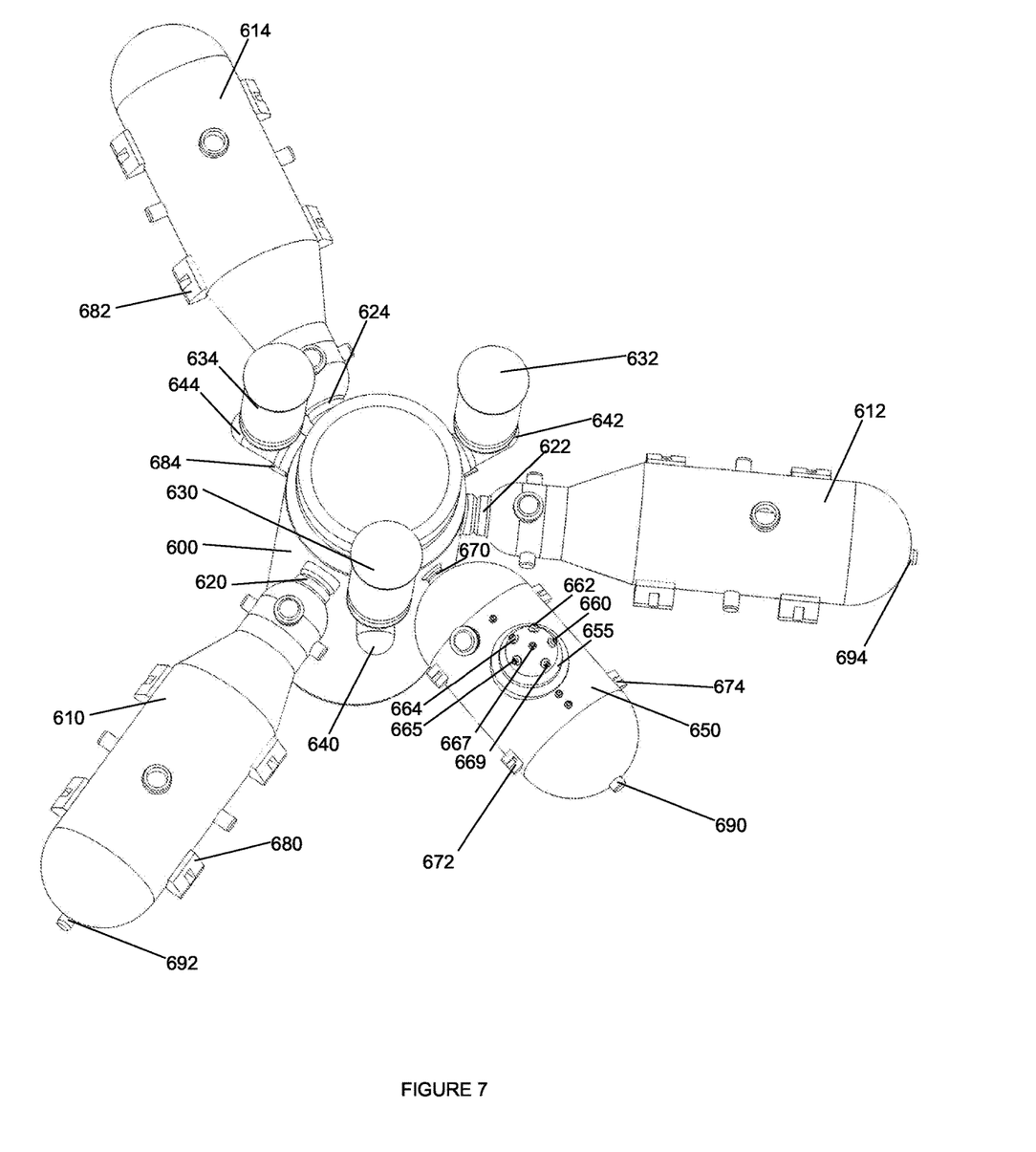
FIG. 7 is a perspective view of a compact PWR with the design proposed with three horizontal SGs connected by nozzles, three RCP connected by nozzles directly to side connection vessels and a horizontal pressurizer.
Figure 8:
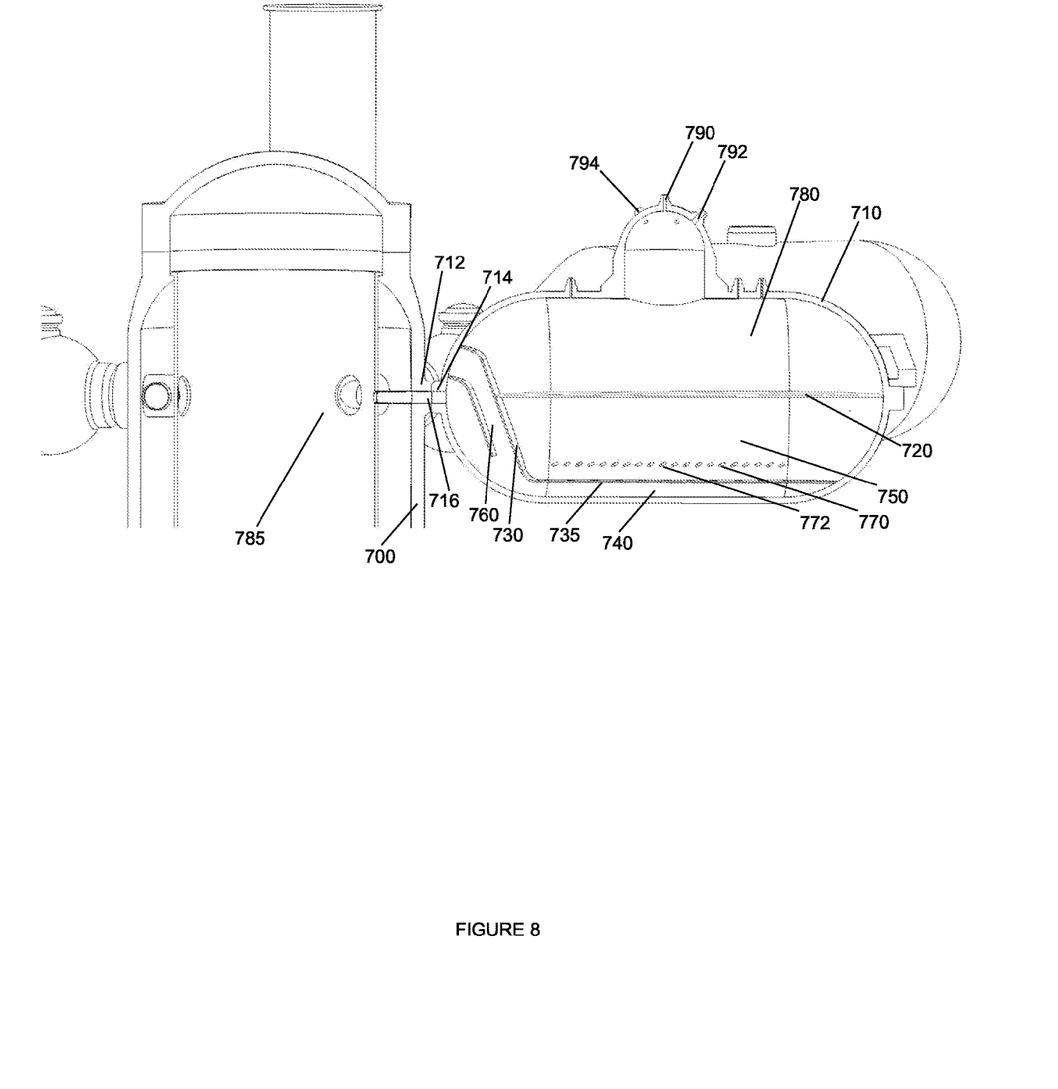
FIG. 8 is a side elevated view of a portion of the design shown in FIG. 7.

FIG. 7 is an external view of a compact PWR with the design proposed with three horizontal SGs connected, three RCP and a horizontal pressurizer, in which the RPV (600) is connected with single respective nozzles to each respective horizontal SG (610) (612) and (614). The external view allows to identify the three connection nozzles (620) (622) and (624) to each SG. The external view also shows the RCP (630) (632) and (634) connected to the RPV (600) by the corresponding side connection vessels (640) (642) and (644). The horizontal pressurizer (650) has an upper dome (655) where are located the connection nozzles with the relief pipes and pressurizer water spray, shown as the nozzles (660) (662) (664) (665) (667) and (669). The horizontal pressurizer is connected with the RPV by a nozzle (670), without using a surge line, and is supported by support pads as the shown by (672) and (674), which are located at the same horizontal plane of the connection nozzle, which is also close to the center of gravity of the pressurizer and the support plane of the GVs (680) (682) and (684). The pressurizer has a sliding key in the outer head (690) that is limited by lateral, top and bottom restrictor, not shown in the picture, that allows axial growing of the pressurizer and radial growing of the RPV, reducing the thermal stress, and limiting the lateral and vertical SG movement by horizontal and vertical seismic and accidental responses, which is similar to the SG sliding keys (692) and (694). This horizontal pressurizer (650) does not require higher elevation compared with SG (610) (612) and (614), not demanding a higher reactor containment building than the height required for all the other components of the primary circuit.

Figure 9:
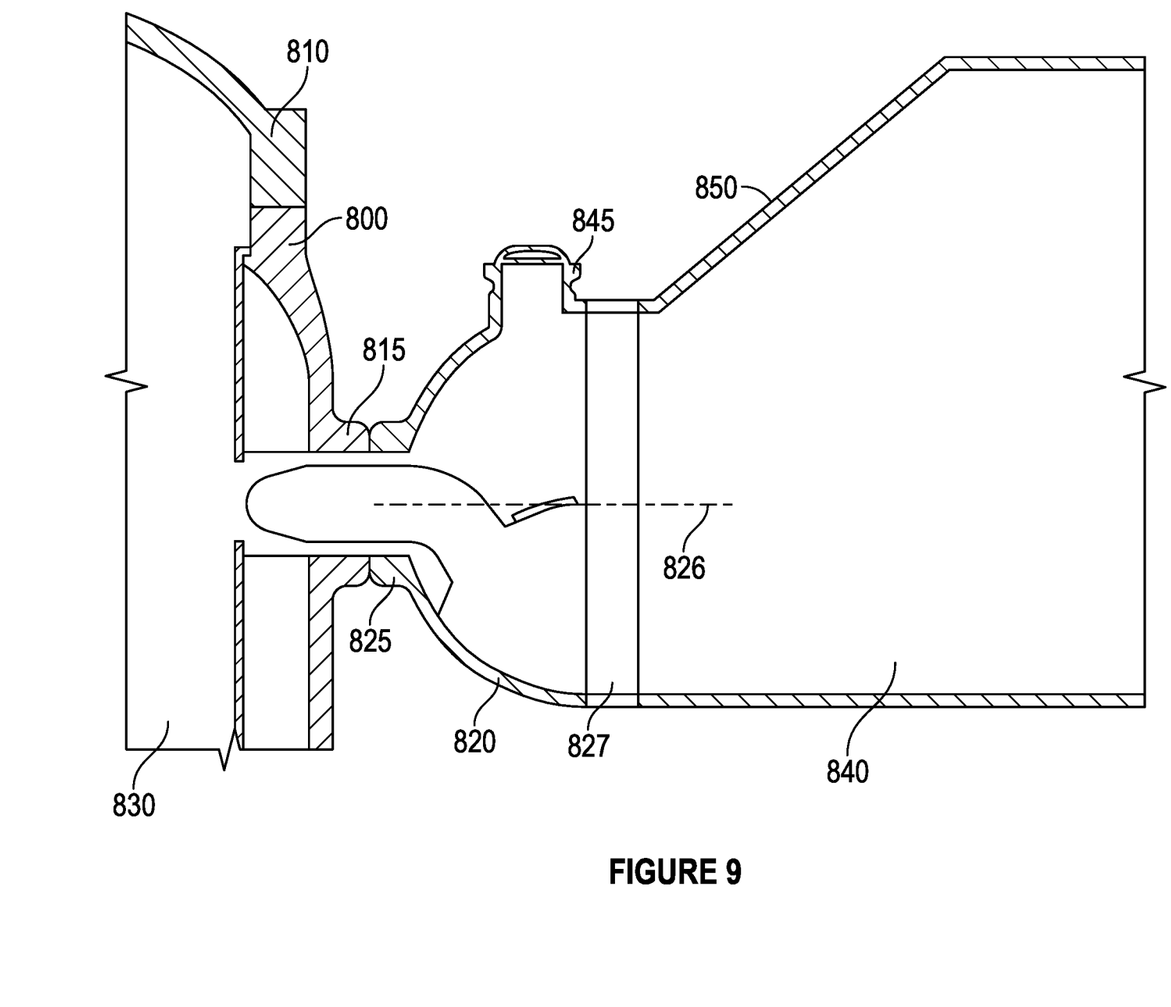
FIG. 9 is a lateral schematic vertical section view of the concept shown in FIG. 2, showing the primary system and secondary system pressure boundary.

Referring to FIGS. 2 and 9, a vertical section of the RPV (800), a vessel closure head (810) and one of its horizontal nozzles (815), are connected with the primary side SG vessel head (820) by the nozzle (825). The main body of the primary side SG vessel head is a curved vessel head with its rotation axis (826) in a horizontal direction, which is connected with the vertical SG tube sheet (827). Excluding the horizontal elongated tubes bundle arrangement of the SG not shown in the picture for simplicity, the primary system coolant, shown as the zone (830) is enclosed by the RPV (800), its vessel closure head (810), the nozzles (815) and (825), the primary side SG vessel head (820) and the vertical SG tube sheet (827). The secondary system steam-water mixture is shown as the zone (840), is enclosed by the non-cylindrical pressure vessel (845) and the vertical SG tube sheet (827). The design allows simple mechanical requirements to the pressure boundaries of both the primary system and secondary system, in a way that could be easily inspected and maintained by through the man-way inspection and maintenance opening (850), allowing its use, for a compact SG horizontal elongated tube bundle arrangement, inspection and maintenance technology applied to compact SG vertical elongated tube bundle arrangement, with excellent experience in many countries around the world.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A compact pressurized water nuclear reactor, comprising:
   a cylindrical reactor pressure vessel oriented with its axis in the vertical direction and having at least one coolant nozzle on its side wall;
   at least one cylindrical steam generator oriented with its axis on the horizontal direction and having a coolant nozzle positioned directly on a first domed end surface;
   at least two reactor coolant pumps connected to the side wall of the reactor pressure; and
   at least one first nozzle connection between the at least one coolant nozzle of the reactor pressure vessel and the coolant nozzle of the at least one steam generator, the nozzle connection comprising:
   an annular steam generator inlet guide channel that separates the nozzle connection into an annular outer portion wherein primary coolant flows from the reactor pressure vessel into the steam generator and an inner portion wherein primary coolant flows back into the reactor pressure vessel from the steam generator after being cooled by circulation through tubes in the steam generator:
   two horizontally extending flow separator pipes each having a first end connected to the inner portion of the annular steam generator inlet guide channel and a second end connected to an inlet of one of the reactor coolant pumps.

2. The compact pressurized water nuclear reactor according to claim 1, further comprising:
- a cylindrical pressurizer oriented with its axis in the horizontal direction and having a coolant nozzle positioned directly on a first domed end surface, the pressurizer containing a vertically extending watertight thermal insulation panel connected to a horizontally extending insulation panel comprising a plurality of equalization holes, the two panels dividing an internal space of the pressurizer into an L-shaped lower portion proximal to the first domed end surface having the coolant nozzle and an upper portion proximal to an opposite second domed end surface;
- a second nozzle connection between the at least one coolant nozzle of the reactor pressure vessel and the coolant nozzle of the pressurizer, the nozzle connection comprising:
- a central channel providing fluid communication between an internal space of the reactor pressure.

3. The compact pressurized water nuclear reactor according to claim 2, wherein the pressurizer further comprises a plurality of support pads located in a same horizontal plane of the second nozzle connection, the supporting pads transferring a load of the pressurizer to a bottom support structure, wherein the support pads are slidably connected to the bottom support structure and configured to allow for thermal -and pressure-related dimensional changes in the pressurizer.

4. The compact pressurized water nuclear reactor of claim 2, wherein the pressurizer further comprises a sliding key on the second domed end surface, the sliding key operatively coupled to a lateral restrictor supported on a bottom support structure, the sliding key and the lateral restrictor configured to allow axial expansion of the pressurizer and radial expansion of the reactor pressure vessel and limit horizontal and vertical movement of the steam generator.

5. The compact pressurized water nuclear reactor according to claim 1, wherein each steam generator further comprises a plurality of support pads located in a same horizontal place of the at least one nozzle connection, the supporting pads transferring a load of the pressurizer to a bottom support structure, wherein the support pads are slidably connected to the bottom support structure and configured to allow for thermal -and pressure-related dimensional changes in the steam generator.

6. The compact pressurized water nuclear reactor of claim 1, wherein each steam generator further comprises a sliding key on a second domed end surface opposite the first domed end surface, the sliding key operatively coupled to a lateral restrictor supported on a bottom support structure, the sliding key and the lateral restrictor configured to allow axial expansion of the steam generator and radial expansion of the reactor pressure vessel and limit horizontal and vertical movement of the steam generator.

* * * * *